United States Patent [19]

Osame et al.

[11] Patent Number: 5,697,045
[45] Date of Patent: Dec. 9, 1997

[54] METHOD OF MAKING AN ALUMINUM ALLOY BRAZING AGENT CONTAINING A FLUX

[75] Inventors: Yasuhiro Osame; Shoichi Sato, both of Tochigi, Japan

[73] Assignee: Showa Aluminum Corporation, Osaka, Japan

[21] Appl. No.: 463,291

[22] Filed: Jun. 5, 1995

[30] Foreign Application Priority Data

Jul. 22, 1994 [JP] Japan .................................. 6-170779
Feb. 27, 1995 [JP] Japan .................................. 7-038538

[51] Int. Cl.$^6$ ........................................................ B22F 1/00
[52] U.S. Cl. .................................................. 419/48; 419/54
[58] Field of Search .................................. 419/46, 48, 50, 419/53, 54

[56] References Cited

U.S. PATENT DOCUMENTS 5,330,090  7/1994  Iwai .......................... 228/56.3

FOREIGN PATENT DOCUMENTS 0 202 008 A1  11/1986  European Pat. Off. .
0 552 567 A1   7/1993  European Pat. Off. .
0 563 750 A1  10/1993  European Pat. Off. .
0 588 545 A1   3/1994  European Pat. Off. .

*Primary Examiner*—Charles T. Jordan
*Assistant Examiner*—Anthony R. Chi

[57] ABSTRACT

An aluminum alloy brazing agent containing a flux is made by compacting a powder mixture of a matrix powder and a flux powder at a first temperature so as to form a rigid piece, and then conducting a secondary forming of the rigid piece into a desired shape at a second temperature. The first temperature is lower than 480° C., preferably lower than 400° C., and more preferably room temperature, so that the compacting may be conducted in the air. The second temperature is 300°–575° C. for the secondary forming, which also may preferably be conducted in an non-oxidizing atmosphere, so that the brazing agent can be of an improved capability of brazing aluminum articles and be produced inexpensively.

9 Claims, 1 Drawing Sheet

5,697,045

1

METHOD OF MAKING AN ALUMINUM ALLOY BRAZING AGENT CONTAINING A FLUX

BACKGROUND OF THE INVENTION

1. Field of the Invention

The present invention relates to a method of making an aluminum alloy brazing agent containing a flux and adapted for use to braze aluminum articles or aluminum alloy articles one to another.

2. Prior Art

In one of the prior art brazing methods for aluminum articles or aluminum alloy articles, it has been a common practice to supply a brazing agent to the articles' portions to be adjoined one to another, together with a flux emulsion or suspension also applied thereto, before heating those portions. In the other prior art method, a gaseous flux has been fed to a brazing oven in which those articles had to be heated. However in such prior art flux brazing methods, the brazing agent and the flux must be applied to the brazed portions separately or successively. This has rendered comparatively intricate the brazing operations. It is another drawback that the applied amount of flux is likely to vary among batches or products, while a superfluous amount of the flux will pollute the brazed products and the brazing oven.

In view of those problems, the present applicant has developed and proposed certain complex types of brazing agents each comprising an aluminum alloy containing a flux (see for example the Japanese Patent Applications No. Hei. 3-346994 and ibid. 3-347010).

A method of producing such complex brazing agents was also proposed by the present applicant, as summarized below.

At first, the average particle size of an aluminum powder (i.e., Al powder), a silicone powder (Si powder), an aluminum-silicon alloy powder (Al-Si powder) and an eutectic powder for example KF-AlF$_3$ powder will be regulated, wherein some of them constitute a matrix (viz. a major component of the brazing agent) and the other being used as a flux. They will be dried sufficiently, before blended with each other at desired blend ratios and at room temperature. A cylindrical container such as a can will be filled with a mixture of these powders, and the container will be sealed airtight, after the interior thereof is evacuated to or below 1 Torr for the purpose of degassing the mixture. The can or the like containing the powder mixture will subsequently be subjected to the hot compacting process, so that those powdery particles are softened and adjoined one to another and to become integral with the can. Next, this can will be severed from the columnar piece of compacted powder mixture, in order to hot extrude the columnar piece into a desired shape such as a sheet.

The hot extrusion, viz. a secondary forming, carried out in the method proposed by the present applicant is necessary to give the aluminum alloy brazing agent containing the flux a shape matching the articles to be brazed. The compacted piece must have a mechanical strength at a certain level to enable the secondary forming. Therefore, the compacting has to be done at a high temperature such that the surfaces of powder particles are softened to become integral with each other to produce a rigid and hard piece. This hot compacting of the powder mixture at the high temperature will endow the piece with an apparent density of 90% or more of, though less than, a theoretical value that may be calculated using the density of each component powder.

It is however to be noted that such a high temperature tends to oxidize the component powders to render poor the brazeability of the brazing agent thus produced. This is why the moisture and air must be removed from the powder mixture before hot compacted within a non-oxidizing atmosphere. The evacuation and degassing of the powder mixture is also effective to enhance the apparent density of compacted piece. Hot degassing and hot compacting of the powder mixture will necessitate a large-scaled plant for carrying out many steps in the manufacture process. The container for temporary accommodation of the powder mixture to be hot degassed and hot compacted must be removed prior to the secondary forming step such as hot extrusion, thus increasing the number of necessary steps. Further, the container which cannot be used twice or more times must be discarded together with a noticeable amount of the compacted powder mixture adhering to the container will increase material loss to raise production cost. In addition, it is not necessarily easy to control and maintain in narrow ranges of the temperature and vacuum. If the powder mixture and the compacted piece thereof undergo for long a temperature higher than the predetermined desirable temperature, then the resultant brazing agent will have a poor flowability and impair appearance of brazed products.

OBJECTS OF THE INVENTION

An object of the present invention is therefore to provide a method of making an aluminum alloy brazing agent containing a flux, which method can not only resolve the problems described above but also afford said agent a satisfactory brazeability at a lower cost.

DETAILED DESCRIPTION OF THE INVENTION

Figure 1:
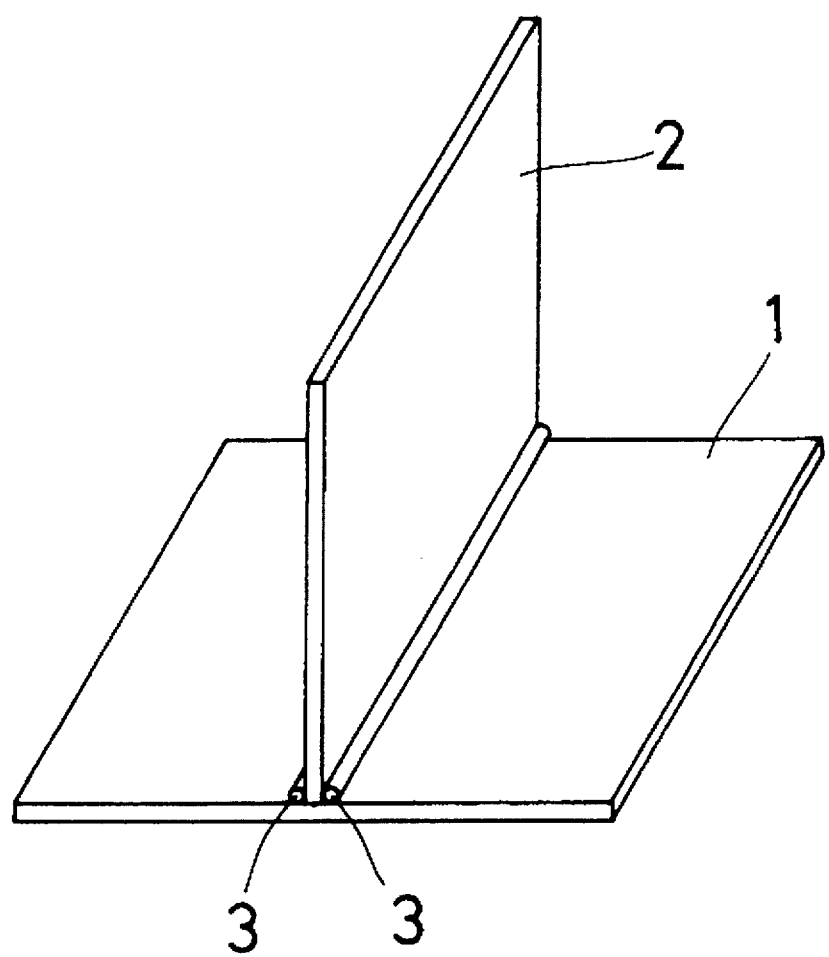
FIG. 1 is a perspective view of test pieces that are brazed to each other ready for a brazeability test.

The present inventors came up with an idea that the density of a compacted powder piece could be lowered to such an extent that the secondary forming thereof would not be disabled. A series of researches and studies have been carried out along this line. As a result, the lowered density of compacted powder piece was found to be effective to simplify and economize the production process of the brazing agent. According to the present invention, the method of making an aluminum alloy brazing agent containing a flux characteristically comprises the steps of: compacting a powder mixture of a matrix powder and a flux powder at a first temperature so as to form a rigid piece; then conducting a secondary forming of the rigid piece into a desired shape at a second temperature.

The first temperature may be lower than 480° C., preferably lower than 400° C. More preferably, the first temperature may be room temperature so that the compacting is a cold compacting carried out without heating the, powder mixture. The compacting may be done within the atmosphere at the first temperature defined above. On the other hand, the second temperature may preferably fall within a range of 300°–575° C. Desirably, the secondary forming of the rigid piece may be carried out within a non-oxidizing air or gas. It is also an important feature of the present method to control an apparent density of the rigid piece to be 50% or more but less than 90% of a theoretical value calculated from the density of the matrix powder and the flux powder.

The matrix powder as the major component of the subject brazing agent provided herein is a metallic powder capable of brazing aluminum articles or aluminum alloy articles. An Al—Si alloy powder or a suitable mixture of Al powder and Si powder may generally be used as the matrix powder. The former is more preferable in order to ensure a better flowability of the brazing agent when the aluminum articles or aluminum alloy articles are brazed. A preferable content by weight of Si in the matrix is 6–15%, or more desirably 9–12% so that an appropriate liquidus line temperature is ensured to afford an excellent brazing.

The matrix powder whose main components are Al and Si may contain unavoidable impurities. One or more voluntary elements may positively be added to the matrix powder. 0.1–2% by weight of Mg (magnesium) contained in the matrix will be effective to improve the mechanical strength, whilst 0.1–0.5% by weight of In (indium) and/or 0.3–5% by weight of Zn (zinc) will ensure corrosion resistance. 0.1–0.5% by weight of Bi (bismuth) will improve the brazeability of articles, and 0.1–0.5% by weight of Be (beryllium) will be effect to more perfectly braze Mg-containing aluminum alloy articles. In a case wherein one or more of Mg, In, Zn, Bi and Be are added, they may be mixed with the brazing agent in their elemental state, or mixed with the matrix powder (viz. Al—Si alloy powder or the mixture of Al powder and Si powder). Alternatively, they may be added in the form of a Mg—Zn alloy powder or the like, or an Al—Si series alloy such as Al—Si—Mg alloy, Al—Si—Zn alloy.

In order to easily attain a desired and properly high density of compacted powder mixture, it is preferable to use each powder consisting of spherical particles such as the so-called atomized powder.

The flux employed in the present invention may be a fluoride flux, a chloride flux or the like. The suitable fluoride fluxes preferably having a melting point of 605° C. or less in view of the melting point of a resultant brazing agent, may include the compounds having a molecular formula $K_\alpha AlF_{\alpha+3}$ ('α' being an integer equal to or greater than '1'), such as $KAlF_4$, $K_2AlF_5$ and $K_3AlF_6$. The fluoride fluxes further include: a simple mixture of KF and $AlF_3$; an eutectic mixture there of; and a certain complex such as potassium fluoroaluminate. Any one of these fluxes will be selected, though two or more of them may be added in combination. On the other hand, the chloride fluxes may have a melting point of 595° C. or less, and must be less hygroscopic so as to protect the brazed portions from corrosion. The preferred examples of chloride fluxes are those which contain $BaCl_2$, NaCl, KCl and/or $ZnCl_2$ as their components. Either any one of them or any mixture thereof may be added to the matrix to produce the brazing agent.

The composition of the brazing agent containing the flux and produced by the present method depends on the ratio of the amount of matrix powder to the flux added thereto. A shortage of the flux in the powder mixture will cause a poorer brazeability, though a superfluous content of the flux renders difficult the compacting and secondary forming of said mixture to produce the brazing agent. Thus, a preferable content of the fluoride flux is 5–30%, and more desirably 10–20% by weight of the powder mixture. A preferable content of the chloride flux is 3–20%, and more desirably 10–15% by weight.

For a uniform distribution of the elements in and a moderately high density of the compacted powder mixture, particle size of each constituent powder must be included in a controlled range. The average particle size of the voluntary elements such as Mg, In, Bi, Be and Zn well as that of Si powder and the flux powder should be smaller than the size of Al powder. Use of Al—Si alloy powder will however allow a slightly larger particle size for these supplementary powders. Preferable ranges of particle size are: 1–200 μm for Al powder; 1–100 μm for Si powder; 1–300 μm for Al—Si powder; 1–100 μm for each supplementary element powder; and 1–100 μm for flux powder.

The powder mixture must be compacted in a mold, in accordance with the present method.

The rigid piece of the compacted powder mixture may be somewhat fragile and contain a number of voids, provided that it can be removed from the mold and handled to be transferred to the next step. Thus, the actual density of the compacted piece need not be 90% or more of the theoretical value but may be from 50% to 90%. Consequently, the compacting of the powder mixture can be done at a moderately low first temperature, and sometimes enabling the 'cold compacting'. An excessively high temperature will cause the partial fusion of those powders so that they sticking to the mold cannot be removed therefrom. Although the present method does not prescribe a severe upper limit, a preferable compacting temperature is below 480° C. and more desirably below 400° C. Since no substantial oxidation takes place for any powder at such a low first temperature, the compacting process need not be carried out within any non-oxidizing atmosphere but may be done within the air. It will be understood that the higher the temperature not exceeding such a moderate limit, the lower would be the necessary compacting pressure. In other words, a higher temperature for a given compacting pressure will raise the density and improve the processability of a compacted piece, whereby the preliminary heating thereof before the secondary forming becomes easier to control.

The compacted rigid piece of the powder mixture taken out of the mold will then be pre-heated to a second temperature so as to become soft enough for the secondary forming thereof to finish the brazing agent of the desired shape. The second temperature not melting but merely softening the constituent powders is preferably from 300° to 575° C. In order to protect the chloride flux from fusion, this temperature is desirably 500° C. or lower. A non-oxidizing atmosphere will be preferred if the compacted piece has a comparatively low density due to a number of voids, in order to prevent oxidation of the secondarily formed product and ensure a satisfactory brazeability. However, the compacted piece may be preheated within the oxidizing air if it has a comparatively high density or is heated to a low temperature. The non-oxidizing atmosphere includes an evacuated atmosphere of 5 Torr or less, nitrogen gas, argon gas (Ar) and the like inert gas each containing 100 ppm of $H_2O$ or less and 500 ppm of $O_2$ or less.

The secondary forming necessary for the compacted and pre-heated piece may be of any type, including the extrusion and the drawing after extrusion.

In summary, the matrix blended with the flux powder will be compacted and then subjected to the secondary forming to obtain a desired shape, wherein the compacting for rendering the raw piece sufficiently rigid to enable the handling thereof is done at a temperature lower than in the prior art methods. Such a relatively cold compacting protecting the components from oxidation can be done in an oxidizing atmosphere. The lower the compacting temperature below the limit of 480° or 400° C. and possibly near room temperature, the less likely to be oxidized are the components. The higher the temperature below this limit, the lower the compacting pressure is rendered without unfavorably lowering the density of compacted piece, thus saving the pressing energy.

The compacted piece, which will then be pre-heated at an appropriate temperature and within a suitable atmosphere so as to soften before undergoing the secondary forming process, may have a number of voids without a possibility of oxidizing the constituent powders and thereby impairing the quality of the resultant brazing agent. If the compacted piece has an almost undesirably low density due to tremendous larger voids, then the secondary forming will be done at a much lower temperature or within a non-oxidizing atmosphere.

Any disposable container which has been necessary in the prior art hot compacting and causing a considerable loss of material is no longer necessary in the present method, thereby saving the labor and cost to remove the container. The low temperature compacting in the air will simplify the plant therefor, so that production cost is further lowered. High quality brazing agents can now be produced in a reliable manner and under an easier control of the simplified sequential processes.

EXAMPLES AND REFERENCE

Now, the present invention will be described in more detail referring to Examples and Reference.

Table 1 shows the matrix powders which were Al powders, Si powders or Al—Si series alloy powders. The fluoride flux was $AlF_3$-KF eutectic powder having an average particle diameter of 15 μm or 70 μm, with the chloride flux being NaCl—KCl—$BaCl_2$ also having an average diameter of 15 μm. These powders were blended with each other at weight ratios listed in Table 1. Examples 1–3, 11–13 and 21–23 were prepared each using Al powder and Si powder. All of the other Examples were made using Al—Si alloy powders, or using Al—Si series alloy powders composed of Al, Si and one or more auxiliary elements.

Those raw powder mixtures were processed to produce the Examples and Reference of aluminum alloy brazing agents each containing the flux, in different manners detailed below.

PRODUCTION PROCESS OF EXAMPLES

Cylindrical molds each having a diameter of 3 inches and 150 mm high were filled respectively with the powder mixtures, and a press was used to compact the respective powder mixtures under varied conditions to produce rigid compacted pieces. Table 2 shows the compacting temperature and the maximum compacting pressure applied to those powder mixtures in the press. Each piece thus compacted in and then easily taken out of the molds was somewhat brittle due to a number of voids or air cells, but rigid enough for smooth handling. The height and apparent density (given as the ratio thereof to a theoretical value) of each compacted piece is shown also in Table 2. Subsequently, those compacted pieces were pre-heated for 120 minutes, in the air, in vacuum, in an inert $N_2$ gas or Ar gas under the conditions listed in Table 3, wherein these gases contained controlled amounts of $H_2O$ and $O_2$. Finally, those pieces were extruded to form wires each having a diameter of 2 mm.

TABLE 1

Contents of matrix elements:  Fluxes

| Brazing agents | % by weight (diameter) | | | Type wt. % (diam.) |
|---|---|---|---|---|
| | Al | Si | Others | |
| EXAMPLES | | | | |
| Nos. 1, 11, 21 | 90 (20) | 10 (%) | — | Fluor. 10 (15) |
| Nos. 2, 12, 22 | 92 (100) | 8 (45) | — | Fluor. 15 (70) |
| Nos. 3, 13, 23 | 88 (10) | 12 (1) | — | Chlor. 7 (15) |
| Nos. 4, 14, 24 | 90 (20) | 10 (—#) | — | Fluor. 10 (15) |
| Nos. 5, 15, 25 | 89 (30) | 10 (—#) | Mg 1 (—#) | Fluor. 10 (15) |
| Nos. 6, 16, 26 | 89.7 (30) | 10 (—#) | In 0.3 (—#) | Fluor. 10 (15) |
| Nos. 7, 17, 27 | 89.7 (30) | 10 (—#) | Bi 0.3 (—#) | Fluor. 10 (15) |
| Nos. 8, 18, 28 | 89.7 (30) | 10 (—#) | Be 0.3 (—#) | Fluor. 10 (15) |
| Nos. 9, 19, 29 | 90 (20) | 10 (—#) | — | Fluor. 10 (15) |
| Nos. 10, 20, 30 | 90 (20) | 10 (—#) | — | Fluor. 10 (15) |
| REFERENCE | 90 (20) | 10 (5) | — | Fluor. 10 (15) |

Notes:
"—#" denotes Al—Si series alloys powders.
"diameter (or diam.)" = particle diameter in μ.
"Fluor." = fluoride, "Chlor." = chloride

TABLE 2

| Brazing agents EXAMPLES | Conditions of the compacting process | | Compacted pieces' | |
|---|---|---|---|---|
| | Temperature (°C.) | Maximum pressure (tons) | Height (mm) | Density (%) |
| Nos. 1–10 | room temp. | 60 | 120 | 85 |
| Nos. 11–20 | 200 | 50 | 120 | 87 |
| Nos. 21–30 | 380 | 50 | 120 | 90 |

TABLE 3

| EXAMPLES | Conditions of the pre-heating of compacted pieces before extruded |
|---|---|
| Nos. 1, 11, 21 | vacuum of 0.1 Torr, 450° C. |
| Nos. 2, 12, 22 | vacuum of 0.9 Torr, 530° C. |
| Nos. 3, 13, 23 | air, 400° C. |
| Nos. 4, 14, 24 | vacuum of 0.1 Torr, 450° C. |
| Nos. 5, 15, 25 | vacuum of 0.1 Torr, 450° C. |
| Nos. 6, 16, 26 | vacuum of 0.1 Torr, 450° C. |
| Nos. 7, 17, 27 | vacuum of 0.1 Torr, 450° C. |
| Nos. 8, 18, 28 | vacuum of 0.1 Torr, 450° C. |
| Nos. 9, 19, 29 | nitrogen, 450° C. $H_2O$: 100 ppm, $O_2$: 250 ppm |
| Nos. 10, 20, 30 | argon, 450° C. $H_2O$: 5 ppm, $O_2$: 10 ppm |

PRODUCTION PROCESS OF REFERENCE

A can made of JIS A-1100 alloy and having a diameter of 3 inches and 200 mm high was filled with the powder mixture, and sealed to be air tight. This can containing the mixture was then placed in an oven operating at 500° C., and heated while evacuating it to 1 Torr or less through a pinch cock attached to the piping extending from the can. The pinch cock was then welded and closed, before hot pressed with a maximum pressure of 400 ton at 480° C. The thus compacted mixture was found substantially integral with the can, with the original height thereof being reduced to 110 mm. After having removed the can from the compacted piece, it was extruded at 500° C. into a wire of 2 mm in diameter.

All the specimens of the brazing agents prepared as EXAMPLES and REFERENCE were tested as to their brazeability, appearance of brazed articles, and surface quality in the manner detailed below. Yield (viz. raw material consumption per unit amount of the agent) as well as production cost were measured and rated in the term of %. Results of these tests are shown in Table 4.

TABLE 4

| EXAMPLES/ REFERENCE | Braze- ability | Appear- ance | Surface qual. (*) | Yield (%) | Cost (%) |
|---|---|---|---|---|---|
| EXAMPLES | | | | | |
| Nos. 1–3 | ○ | ○ | ○ | 95 | 65 |
| Nos. 4–10 | ○ | ○ | ○ | 95 | 70 |
| Nos. 11–13 | ○ | ○ | ○ | 95 | 70 |
| Nos. 14–20 | ○ | ○ | ○ | 95 | 75 |
| Nos. 21–23 | ○ | ○ | ○ | 95 | 70 |
| Nos. 24–30 | ○ | ○ | ○ | 95 | 75 |
| REFERENCE | ○ | ○ | ○ | 70 | 100 |

Notes:
"Surface qual." denotes the quality rating according to the 'gridiron' pattern test.

[Brazeability]

As illustrated in FIG. 1, a first plate 1 which was 1 mm thick and 50 mm×70 mm wide as well as a second plate 2 also 1 mm thick and 50 mm square wide were severed from a JIS A-3003 plate. The second plate 2 was erected on the first plate 1 so as to assume a reversed T-shape as a whole. Two lengths of 50 mm of each brazing agent were set in place to extend between the plates 1 and 2 and along respective sides of the base of the upright plate 2. The combined plates of T-shape was then heated at 600° C. for 3 minutes in the air so as to braze the adjoined portions of the plates, and a ratio (%) by volume of the brazing agent to the space which it apparently occupied was measured so that the brazeability was rated as follows:

○ . . . 10%
X . . . <100%

[Appearance]

The brazed portions were visually inspected and rated as follows:

○ . . . no residual flux, and clean surface
X . . . residual flux causing brown or black spots

[Surface quality]

A paint was sprayed onto the brazed portions each having a surface divided into gridiron pattern, so that the number of unit squares holding the paint was counted per 100 unit squares. The brazed test piece of Example 3 involving the chloride flux was washed with hot water and with cold water, before spraying the paint. The rating of test results is as follows:

○ . . . 90 or more
Δ . . . less than 90

[Yield]

'Yield' is the ratio in % of the weight of each extruded brazing agent to that of the corresponding powder mixture.

[Production cost]

This cost in % is the ratio of the production cost of each Example to that of Reference.

As will be seen in Table 4, each compacted piece of powder mixture could be removed from the mold and subjected to the secondary forming, without incurring any loss in raw materials. Thus, the brazing agent could be produced at a higher yield and through fewer steps. The brazing agent produced by the present method proved excellent and satisfactory in its brazeability, appearance and surface quality. In contrast, the brazing agent of Reference incurred a noticeable loss of materials due to removal of the can and necessitated some additional steps, thus raising production cost.

What is claimed is:

1. A method of making an aluminum alloy brazing agent containing a flux, the method comprising the steps of:

compacting a powder mixture of a matrix powder and a flux powder at a first temperature lower than 400° C. so as to form a rigid piece whose actual density is 50% or higher but lower than 90% of a theoretical density; and then conducting a secondary forming of the rigid piece into a desired shape at a second temperature.

2. The method as defined in claim 1, wherein the first temperature is room temperature.

3. The method as defined in claim 1, wherein the step of compacting the powder mixture is carried out in the air.

4. The method as defined in claim 1, wherein the step of compacting the powder mixture is carried out the air.

5. The method as defined in claim 1, wherein the step of compacting the powder mixture is carried out in the air.

6. The method as defined in claim 2, wherein the step of compacting the powder mixture is carried out in the air.

7. The method as defined in any of the preceding claims 1, 2, 3, 4, 5, or 6 wherein the second temperature is from 300° to 575° C.

8. The method as defined in claims 1, 2, 3, or 4, wherein the step of conducting the secondary forming of the rigid piece is carried out in a non-oxidizing atomsphere.

9. The method as defined in claims 1, 2, 3, or 4, wherein the step of conducting the secondary forming of the rigid piece is carried out in a non-oxidizing atomsphere, and the second temperature is from 300° to 575° C.

* * * * *